No. 711,569. Patented Oct. 21, 1902.
E. P. HOLLIS.
LOCOMOTIVE DEOBSTRUCTER.
(Application filed Apr. 19, 1902.)
(No Model.)
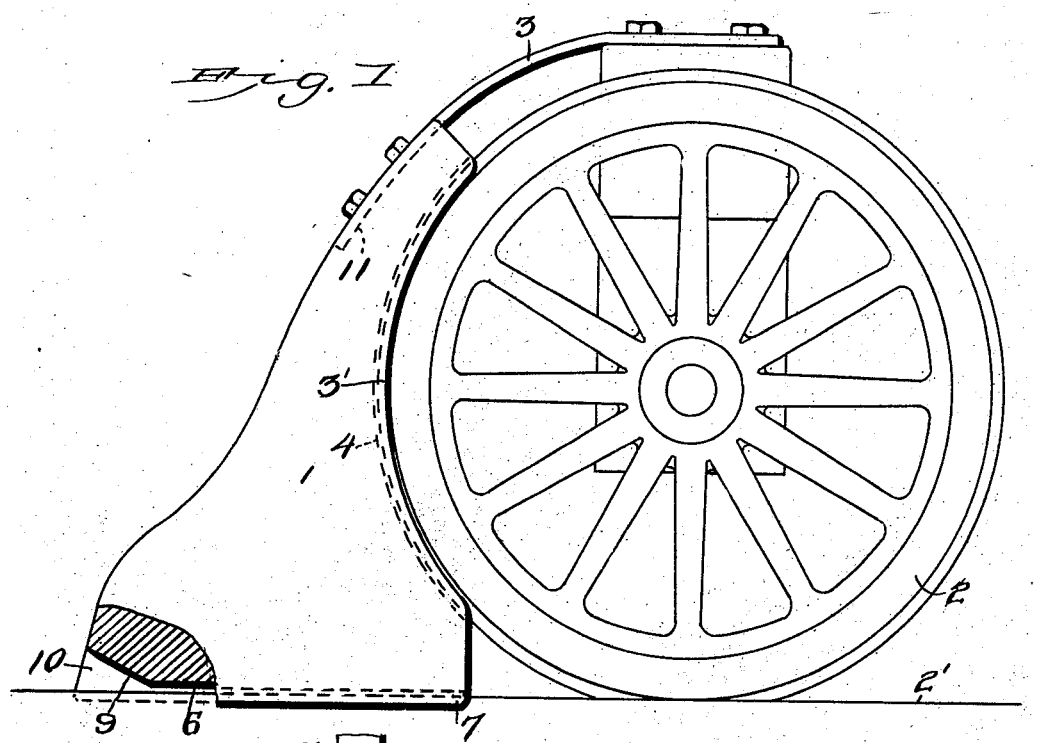
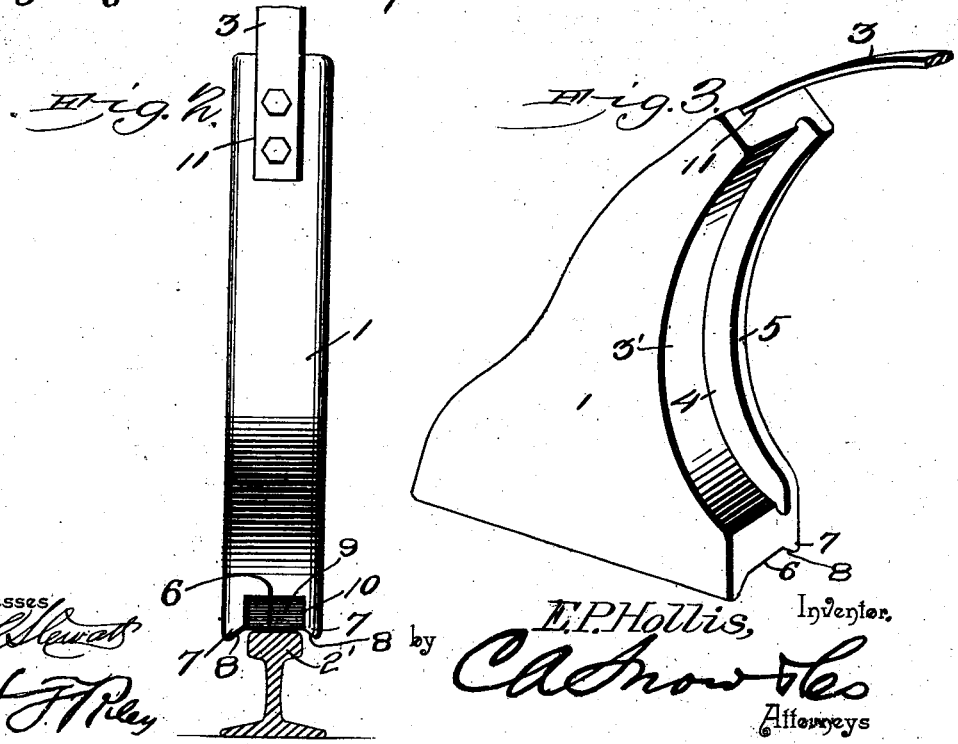

UNITED STATES PATENT OFFICE.

ELIJAH P. HOLLIS, OF GREENVILLE, SOUTH CAROLINA.

LOCOMOTIVE-DEOBSTRUCTER.

SPECIFICATION forming part of Letters Patent No. 711,569, dated October 21, 1902.

Application filed April 19, 1902. Serial No. 103,831. (No model.)

*To all whom it may concern:*

Be it known that I, ELIJAH P. HOLLIS, a citizen of the United States, residing at Greenville, in the county of Greenville and State of South Carolina, have invented a new and useful Locomotive-Deobstructer, of which the following is a specification.

The invention relates to improvements in locomotive-deobstructers.

The object of the present invention is to provide a simple, inexpensive, and efficient device of great strength and durability adapted to be readily applied to a locomotive or to a car and capable of effectively removing dangerous obstructions from the rails to prevent a train from being derailed or otherwise injured by the same and of also operating as a track and wheel brake while in engagement with an obstruction.

The invention consists in the construction and novel combination and arrangement of parts hereinafter fully described, illustrated in the accompanying drawings, and pointed out in the claims hereto appended.

In the drawings, Figure 1 is an elevation, partly in section, of a locomotive-deobstructer constructed in accordance with this invention. Fig. 2 is an end elevation of the fender, illustrating the arrangement of the same with relation to the rail. Fig. 3 is a detail perspective view of the fender.

Like numerals of reference designate corresponding parts in all the figures of the drawings.

1 designates a fender of approximately triangular form, designed to be arranged in advance of the front wheel 2 of a locomotive or car and normally supported a slight distance above a rail 2' by means of a spring 3, which is designed to be secured to the front truck-frame of the locomotive or to any other suitable portion of a car or locomotive, whereby the fender will be normally supported in approximately fixed relation with the wheel to prevent it from vibrating into engagement with either the wheel or the rail. The fender, which tapers toward the top, has a curved rear face 3' to conform to the configuration of the wheel and is provided with a groove 4 to receive the flange of the wheel, and it also has a flange 5 arranged at the outer side of the groove 4 and overlapping the wheel and spaced from the flanged side of the same. The lower face of the fender is longitudinally grooved to provide a rail-engaging face 6 and depending side flanges 7, having beveled inner faces 8 and extending laterally beyond the rail. These depending side flanges are sufficient to guide the fender on the rail when the former is in contact with the latter, and they are also adapted to enable the fender to readily ride over a frog-point or a switch-tongue. The fender is provided at the front of its lower face with beveled portions forming inclined central and side faces 9 and 10 and adapted to enable the fender to readily ride over a small obstruction, such as a torpedo or the like, without causing the fender to remove such obstruction or to engage either the wheel or the track. Should, however, the fender come in contact with a log or other obstruction dangerous to the passage of a train, it will be forced downward to the rail and backward against the wheel to cause the fender to operate as a track and wheel brake, and at the same time the fender will throw the obstruction off the rail and prevent the said obstruction from getting beneath the wheel and derailing or otherwise injuring the train.

The spring 3, which consists of a curved bar of resilient material, as shown, has its front end seated in a recess 11 of the upper portion of the fender, and it is suitably secured to the latter.

It will be seen that the device is exceedingly simple and inexpensive in construction, that it is adapted to be readily applied to locomotives, cars, and analogous vehicles, and that it is capable of readily passing over small obstructions and of throwing large obstructions from the rails to prevent such obstructions from getting beneath the wheels and derailing or otherwise injuring the locomotive, car, or train. It will also be clear that the fender is adapted to operate as a wheel and track brake and that while being normally supported above the rail it is held against lateral movement on the same.

What I claim is—

1. An automatically-operating locomotive-deobstructer provided at its front with an inclined face extending upwardly and rearwardly, said deobstructer having a curved rear face to conform to the configuration of the wheel and designed to be arranged in advance of the same, and means for yieldingly supporting the deobstructer adjacent to the wheel and the rail, substantially as described.

2. An automatically-operating locomotive-deobstructer presenting an inclined front face and having a curved rear face to conform to the configuration of a wheel, said deobstructer being provided with an inclined bottom face to enable it to pass over small objects, and means for yieldingly supporting the deobstructer adjacent to a wheel and the rail, substantially as described.

3. A locomotive-deobstructer having an inclined front face and provided with a curved rear face, said deobstructer being also provided at its lower face with a longitudinal groove having beveled side walls and an inclined front portion to enable the deobstructer to pass over small objects, and means for supporting the deobstructer adjacent to a wheel and a rail, substantially as described.

4. A locomotive-deobstructer having an inclined front face to enable it to remove obstructions from a rail and provided at its lower face with an inclined portion to enable the deobstructer to pass over small objects, and means for supporting the deobstructer adjacent to a rail, substantially as described.

5. A locomotive-deobstructer having its front face inclined upward and rearward and provided with a curved rear face, and a spring consisting of a resilient bar secured at one end to the deobstructer and supporting the same adjacent to and normally out of contact with the wheel and the rail, whereby the deobstructer is adapted to operate automatically, substantially as described.

6. A locomotive-deobstructer of approximately triangular form, having an inclined front face extending upward and rearward, said deobstructer being provided with a curved rear face to fit a wheel, and having adjacent to the wheel a side flange and provided with depending bottom flanges adapted to straddle a rail and means for supporting the deobstructer adjacent to a wheel and a rail, substantially as described.

In testimony that I claim the foregoing as my own I have hereto affixed my signature in the presence of two witnesses.

ELIJAH P. HOLLIS.

Witnesses:
J. H. JOCHUM, Jr.,
W. J. DILLON.